(12) United States Patent
Liu et al.

(10) Patent No.: US 11,354,447 B2
(45) Date of Patent: Jun. 7, 2022

(54) DATA AUTHORIZATION INFORMATION ACQUISITION METHODS, APPARATUSES, AND DEVICES

(71) Applicant: ALIPAY (HANGZHOU) INFORMATION TECHNOLOGY CO., LTD., Zhejiang (CN)

(72) Inventors: Qin Liu, Hangzhou (CN); Shubo Li, Hangzhou (CN); Yuan Chen, Hangzhou (CN); Renhui Yang, Hangzhou (CN); Wenyu Yang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/349,764

(22) Filed: Jun. 16, 2021

(65) Prior Publication Data
US 2021/0312089 A1     Oct. 7, 2021

(30) Foreign Application Priority Data
Aug. 28, 2020   (CN) .......................... 202010889325.5

(51) Int. Cl.
*G06F 21/64*     (2013.01)
*G06F 21/31*     (2013.01)
(Continued)

(52) U.S. Cl.
CPC .............. *G06F 21/64* (2013.01); *G06F 21/31* (2013.01); *G06F 21/602* (2013.01); *G06F 21/78* (2013.01)

(58) Field of Classification Search
CPC ........ G06F 21/64; G06F 21/31; G06F 21/602; G06F 21/78; G06F 21/604
See application file for complete search history.

(56) References Cited

U.S. PATENT DOCUMENTS 9,473,910 B2 * 10/2016  Lin .......................... H04L 51/12
10,505,741 B1 * 12/2019  Conley ................... H04L 9/083
(Continued)

FOREIGN PATENT DOCUMENTS

| CN | 1996955 | 7/2007 |
|---|---|---|
| CN | 103677935 | 3/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ali S Abyaneh
(74) *Attorney, Agent, or Firm* — Fish & Richardson P.C.

(57) ABSTRACT

Embodiments of the present specification disclose data authorization information acquisition methods, apparatuses, and devices. One method comprises: receiving, from a data requestor and for data, a data use permission application; determining, based on the data use permission application, an approver, wherein the approver is an owner of the data; sending the data use permission application to the approver; receiving acknowledgement information of the approver for receiving the data use permission application; generating data authorization information based on the acknowledgement information; and sending the data authorization information to the data requestor.

16 Claims, 5 Drawing Sheets

(51) Int. Cl.
*G06F 21/60* (2013.01)
*G06F 21/78* (2013.01)

(56) References Cited

U.S. PATENT DOCUMENTS

| | | | |
|---|---|---|---|
| 10,873,456 | B1* | 12/2020 | Dods .................... H04L 9/14 |
| 2015/0227749 | A1* | 8/2015 | Schincariol ......... H04L 41/0806 726/28 |
| 2018/0060496 | A1 | 3/2018 | Bulleit et al. |
| 2018/0254898 | A1 | 9/2018 | Sprague et al. |
| 2019/0020661 | A1* | 1/2019 | Zhang .................. H04L 9/3242 |
| 2019/0294817 | A1 | 9/2019 | Hennebert et al. |
| 2020/0177604 | A1* | 6/2020 | Wei .................... H04L 63/0442 |
| 2020/0226285 | A1* | 7/2020 | Bulleit .................. G06F 21/33 |
| 2021/0058788 | A1* | 2/2021 | Su ....................... G06Q 20/065 |

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111597565 | 8/2020 |
| CN | 111741036 | 10/2020 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/348,975, filed Jun. 16, 2021, Renhui Yang.
U.S. Appl. No. 17/364,602, filed Jun. 30, 2021, Renhui Yang.
U.S. Appl. No. 17/359,069, filed Jun. 25, 2021, Yuan Chen.
U.S. Appl. No. 17/359,219, filed Jun. 25, 2021, Yuan Chen.
U.S. Appl. No. 17/359,476, filed Jun. 25, 2021, Wenyu Yang.
Alansari, "A Blockchain-based Approach for Secure, Transparent and Accountable Personal Data Sharing," Philosophy Doctor Degree Thesis of University of Southampton, Aug. 2020, 218 pages.
Extended European Search Report in European Application No. 21181413.2, dated Dec. 9, 2021, 10 pages.
Rahman et al., "Protecting Personal Data using Smart Contracts," Cornell University Library, arXiv:1910.12298v1, Oct. 27, 2019, 13 pages.

\* cited by examiner

DATA AUTHORIZATION INFORMATION ACQUISITION METHODS, APPARATUSES, AND DEVICES

CROSS-REFERENCE TO RELATED APPLICATIONS

This application claims priority to Chinese Patent Application No. 202010889325.5, filed on Aug. 28, 2020, which is hereby incorporated by reference in its entirety.

TECHNICAL FIELD

The present application relates to the field of computer technologies, and in particular, to data authorization information acquisition methods, apparatuses, and devices.

BACKGROUND

Personal privacy data includes information (such as a phone number, an address, a credit card number, and authentication information) that can be used to identify or locate an individual and sensitive information (such as a health condition, financial information, browsing history, and important company documents of the individual). In the information age, personal data, especially personal privacy data, is increasingly transmitted on the Internet or on various platforms. How to ensure that data is provided only to an authorized data requestor without being obtained by other participants is a technical problem that needs to be resolved urgently for personal data transmission.

SUMMARY

To resolve the previously described technical problem, the embodiments of the present specification are implemented as follows:

According to a first aspect, embodiments of the present specification provide a data authorization information acquisition method, including: a data use permission application submitted by a data requestor for first data is obtained; a permission approver of the first data is determined based on the data use permission application, where the permission approver is an owner of the first data; the data use permission application is sent to the permission approver; acknowledgement information of the permission approver is obtained; data authorization information is generated based on the acknowledgement information; and the data authorization information is sent to the data requestor.

According to a second aspect, embodiments of the present specification provide a data authorization information acquisition apparatus, including: a data use permission application acquisition module, configured to obtain a data use permission application submitted by a data requestor for first data; a permission approver determining module, configured to determine a permission approver of the first data based on the data use permission application, where the permission approver is an owner of the first data; a data use permission application sending module, configured to send the data use permission application to the permission approver; an acknowledgement information acquisition module, configured to obtain acknowledgement information of the permission approver; a data authorization information generation module, configured to generate data authorization information based on the acknowledgement information; and a data authorization information sending module, configured to send the data authorization information to the data requestor.

According to a third aspect, embodiments of the present specification provide a data authorization information acquisition device, including: at least one processor; and a memory communicably coupled to the at least one processor, where the memory stores instructions that can be executed by the at least one processor, and the instructions are executed by the at least one processor to enable the at least one processor to: obtain a data use permission application submitted by a data requestor for first data; determine a permission approver of the first data based on the data use permission application, where the permission approver is an owner of the first data; send the data use permission application to the permission approver; obtain acknowledgement information of the permission approver; generate data authorization information based on the acknowledgement information; and send the data authorization information to the data requestor.

According to a fourth aspect, embodiments of the present specification provide a computer-readable medium. The computer-readable medium stores computer-readable instructions, and the computer-readable instructions can be executed by a processor to implement a data authorization information acquisition method.

An embodiment of the present specification can be implemented to achieve the following beneficial effects: A data permission management operation is offloaded from a big data centralization platform to a data owner, so that the data owner can locally perform management operations such as data authorization and a query operation of the approval process on data, without relying on a centralized management center of the big data platform, thereby saving resources.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description show some embodiments of the present application, and a person of ordinary skill in the art can still derive other drawings from these accompanying drawings without creative efforts.

DESCRIPTION OF EMBODIMENTS

To make the objectives, technical solutions, and advantages of the one or more embodiments of the present specification clearer, the following clearly and comprehensively describes the technical solutions of the one or more embodiments of the present specification with reference to specific embodiments of the present specification and corresponding accompanying drawings. Clearly, the described embodiments are merely some but not all of the embodiments of the present specification. All other embodiments obtained by a person of ordinary skill in the art based on the embodiments of the present specification without creative efforts shall fall within the protection scope of the one or more embodiments of the present specification.

The technical solutions provided in the embodiments of the present specification are described in detail below with reference to the accompanying drawings.

In the existing technology, all existing data permission management services are managed by using centralized management centers. However, for a multi-user single-operation data service scenario, if a management center is used for management, resources are wasted (permission information needs to be stored and managed). In addition, the centralized management center is not applicable to a decentralized blockchain network.

In the present solutions, a data permission management operation is offloaded from a big data centralization platform to a data owner, so that the data owner can locally perform management operations such as data authorization and a query operation of the approval process on data, without relying on a centralized management center of the big data platform. In addition, the authorization has integrity and authenticity, and supports configurable process control in different scenarios.

The data management operations include the following:
1. Permission application: Perform approval on applied data permission based on an approval template, and support dynamic processes such as endorsement and forwarding.
2. Application status query: Query a progress status of an approval process.
3. Authorization: Grant corresponding data permission (grant a Verifiable Claim, VC) to an approved member.
4. Authentication: Verify data permission of a member.
5. Permission revocation: Revoke granted permission (revoke a VC).

Figure 1:
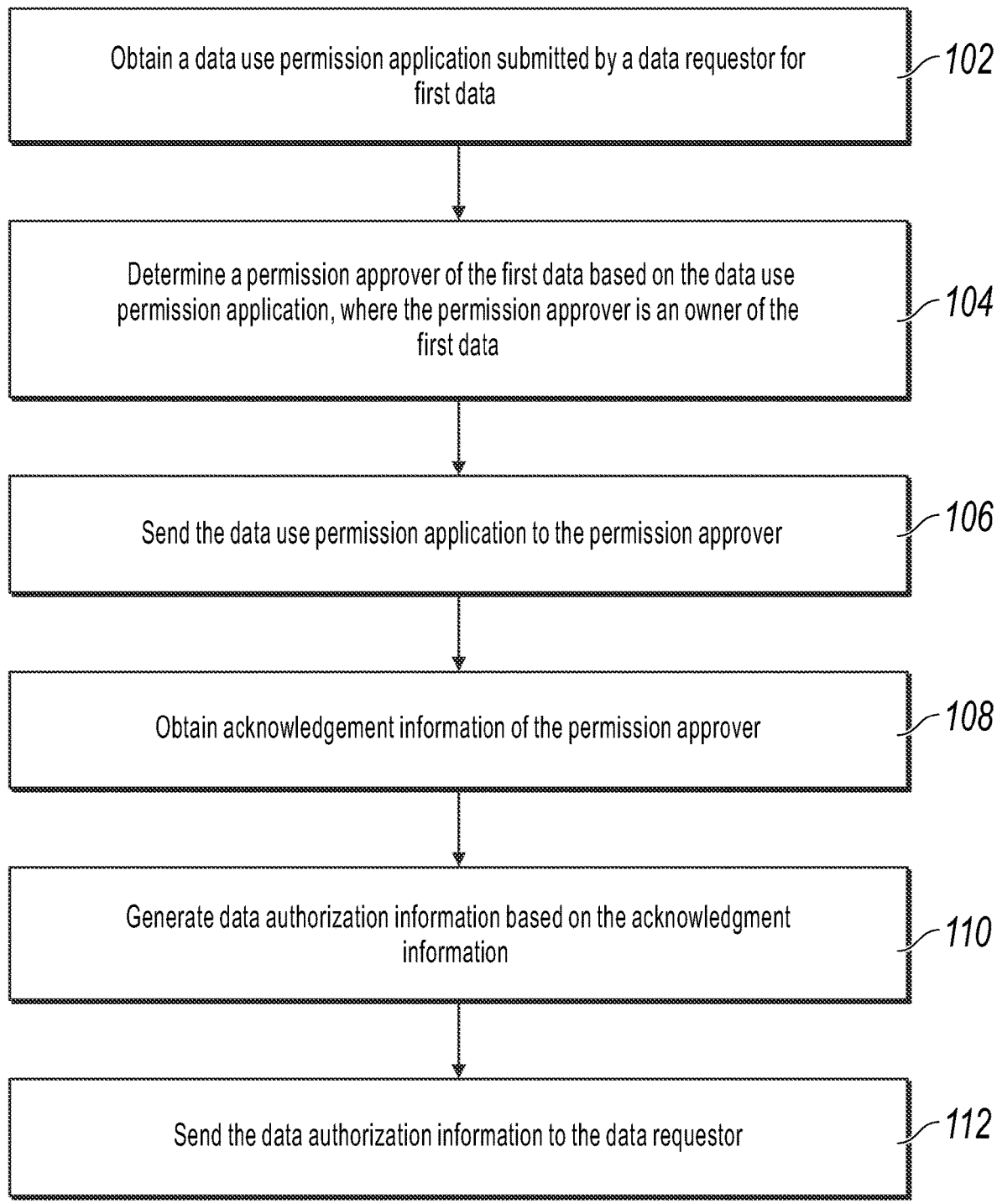
FIG. 1 is a schematic flowchart illustrating a data authorization information acquisition method, according to embodiments of the present specification.

To solve the defects in the existing technology, the present solutions provide the following embodiments:

FIG. 1 is a schematic flowchart illustrating a data authorization information acquisition method, according to embodiments of the present specification. From a program perspective, the process can be executed by a program mounted on an application server or an application client device.

As shown in FIG. 1, the process can include the following steps.

Step 102: Obtain a data use permission application submitted by a data requestor for first data.

The solution can be executed by a service platform. The service platform can be a centralized platform, or can be a decentralized platform, such as a blockchain network.

The data requestor can be an individual user or an enterprise user. The data requestor here can be a user or a device of the user.

The data requestor can be a direct registered user of the service platform, or can be an indirect registered user registered through a proxy service provider of the service platform. When the data requestor is a direct registered user of the service platform, the data requestor can directly initiate the data use permission application to the platform. When the data requestor is an indirect registered user of the service platform, the data requestor can submit the data use permission application through a proxy service provider. In an implementation, if the data requestor is not a node of a blockchain network, the data use permission application needs to be submitted through a proxy service provider (a node of the blockchain network).

The first data can be data that can be digitally transmitted, such as a text, a picture, or a video. The first data can be personal privacy data, or can be a work such as a created text, picture, or video.

The data use permission application can indicate data applied for, a use period, a use purpose, etc.

Step 104: Determine a permission approver of the first data based on the data use permission application, where the permission approver is an owner of the first data.

The data use permission application includes applied data (the first data) and applicant information (the data requestor). The data requestor can obtain the first data only with the consent of the data owner of the first data. Therefore, the owner of the first data, i.e., the permission approver of the first data, needs to be determined. The first data may be mixed data or may involve multiple owners. Therefore, there may be one, two, or multiple permission approvers.

The service platform can store a mapping relationship between the first data and the owner of the first data, and then determine the owner of the first data based on the mapping relationship.

Step 106: Send the data use permission application to the permission approver.

The permission approver can be an individual user or an enterprise user. The permission approver here can be a user or a device of the user. The permission approver can be a direct registered user of the service platform, or can be an indirect registered user registered through a proxy service provider of the service platform.

Step 108: Obtain acknowledgement information of the permission approver.

When receiving the data use permission application sent by the data requestor, the permission approver can perform approval on the data use permission application based on an online or offline agreement and contract. The acknowledgement information is used to indicate that the data requestor is agreed to use the first data.

In addition, when there is more than one permission approver, there can be multiple pieces of acknowledgement information.

Step 110: Generate data authorization information based on the acknowledgement information.

The data authorization information generated based on the acknowledgement information can include an authorized user, a use permission type, a validity period, etc. When the data requestor can obtain first data encrypted by using a public key of the permission approver, the data authorization information can be alternatively a private key of the permission approver.

The data authorization information can be alternatively a verifiable claim (VC) in a blockchain. The VC is obtained after the permission approver performs digital signature. Any user can verify the VC based on the public key of the permission approver.

The data authorization information can be generated by the service platform based on a predetermined program, or can be generated by the permission approver and then sent to the service platform.

Step 112: Send the data authorization information to the data requestor.

The data authorization information can be directly sent to the data requestor by the service platform, or can be sent to the data requestor through the proxy service provider.

It should be understood that, some steps of the method in the one or more embodiments of the present specification are interchangeable in terms of sequence based on actual needs, or some steps of the method can be omitted or deleted.

In the method in FIG. 1, a data permission management operation is offloaded from a big data centralization platform to a data owner, so that the data owner can locally perform management operations such as data authorization and a query operation of the approval process on data, without relying on a centralized management center of the big data platform, thereby saving resources. In the entire process, the service platform is only used to forward a data request and data information without storing permission data of the data.

Based on the method in FIG. 1, embodiments of the present specification further provide some specific implementations of the method. The specific implementations are described below.

Optionally, the determining a permission approver of the first data based on the data use permission application can specifically include:

determining a data type of the first data based on the data use permission application;

determining a smart contract based on the first data and the data type, where the smart contract is a permission application approval process for the first data; and determining the permission approver of the first data based on the smart contract.

In this implementation, the permission approver of the first data is determined by using the smart contract. It can be understood that the smart contract can be a program predetermined by the permission approver of the first data, and a corresponding smart contract can be triggered for any permission application for the first data.

The data type of the first data can be understood as whether the first data is original data. Privacy conditions of the original data and non-original data are different, the non-original data is usually obtained after some processing is performed on the original data, and a privacy degree of the non-original data is reduced relative to the original data. Therefore, different permission approval processes can be triggered based on different data types.

In this implementation, the smart contract is proactively triggered, the service platform makes only some simple determinations, and a program for executing the determinations can be predetermined.

The smart contract can be a program set on a central platform, or can be a program set in a blockchain network. The permission approval process can be set by the data owner; and sent to the blockchain for consensus, and then stored in blocks of nodes after the consensus succeeds. Any node can trigger the smart contract as a data requestor.

The blockchain technology starts, from Ethereum, to support a user in creating and invoking some complex logic in a blockchain network. This is one of the biggest advancements of Ethereum relative to the bitcoin technology. As a programmable blockchain, the core of Ethereum is an Ethereum virtual machine (EVM), and each Ethereum node can run an EVM. The EVM is a Turing-complete virtual machine. It means that various types of complex logic can be implemented by using the EVM. The user can deploy and invoke a smart contract in Ethereum by using the EVM. In a deployment phase, the user can send a transaction that includes creating a smart contract to an Ethereum network. A data field of the transaction can include code (such as byte code) of the smart contract, and a to field of the transaction is null. After transaction distribution and consensus, nodes in the Ethereum network can separately execute the transaction by using EVMs, and generate corresponding contract instances, to complete smart contract deployment. At this time, the blockchain can have a contract account corresponding to the smart contract, and the contract account has a specific contract address. In an invocation phase, a user (which can be the same as or different from the user deploying the smart contract) sends a transaction used to invoke the smart contract to the Ethereum network. A from field of the transaction is an address of an external account corresponding to the user, a to field of the transaction is a contract address of the smart contract that needs to be invoked, and a data field of the transaction includes a method and a parameter for invoking the smart contract. After an agreement is reached among the nodes by using a consensus mechanism, the smart contract declared in the transaction for invocation is independently executed on each node of the Ethereum network in a specified way, and all execution records and data are stored in the blockchain. Therefore, after the transaction is completed, a transaction certificate that cannot be tampered with or lost is stored in the blockchain. With the development of the blockchain technology, in addition to the EVM, many other types of virtual machines are generated, such as a WASM (WebAssembly) virtual machine.

Each blockchain node can create and invoke a smart contract by using a virtual machine. Storing a transaction including the smart contract and an execution result of the transaction in a blockchain ledger or storing the entire ledger in each full node can be challenging for privacy protection. Privacy protection can be implemented by using multiple technologies, such as cryptographic technologies (such as homomorphic encryption or zero-knowledge proof), hardware privacy technologies, and network isolation technologies. The hardware privacy protection technologies typically include a trusted execution environment (TEE).

Optionally, when there are at least two permission approvers, the sending the data use permission application to the permission approver can specifically include:

sending the data use permission application to a first permission approver; and sending the data use permission application and first acknowledgement information of the first permission approver to a second permission approver after obtaining the first acknowledgement information.

In some cases, there can be multiple permission approvers. For example, if the first data includes second data, in addition to the owner of the first data, an owner of the second data does not need to perform approval. An example of this case can be as follows: Script A (the first data) is adapted based on biography B (the second data). When use permission for script A needs to be obtained, the consent of the author of biography B further needs to be sought when the consent of the author of script A is sought. Therefore, the data use permission application needs to be separately sent to the first permission approver and the second permission approver for analysis and approval.

In some cases, the permission approvers can separately perform approval to obtain multiple pieces of acknowledgement information, and then the data authorization information is generated based on the multiple pieces of acknowledgement information. The approvals by the permission approvers do not follow a particular order. In some special cases, there is a certain relationship between the permission approvers, i.e., another permission approver can perform approval only after a permission approver completes approval. The previously described example is still used. To obtain the use permission of script A, the consent of the author of biography B must be sought. At this time, a data use permission application can be first sent to the author of biography B, and after the consent of the creator of the biography B is sought, the data use permission application and acknowledgement information of the author of biography B are sent to the author of script A. At this time, with the consent of the author of biography B, the approval of the author of script A has practical significance. If the consent of the creator of the biography B fails to be sought, the approval fails. Based on such setting, resource waste can be avoided.

Optionally, the generating data authorization information based on the acknowledgement information can specifically include:

determining authorized data, an authorized user, and a validity period based on the acknowledgement information, where the authorized data is the first data, and the authorized user is the data requestor; and generating the data authorization information based on the authorized data, the authorized user, and the validity period, where the data authorization information includes the first data and the data requestor.

To specify a use range of the data authorization information, the authorized data, the authorized user, and the validity period can be specified in the data authorization information. The validity period can be indicated by the data requestor in the data use permission application, or can be approved by the permission approver. The permission approver can determine the validity period based on a data use purpose indicated by the data requestor.

Optionally, after the generating data authorization information based on the acknowledgement information, the method can specifically include the following:

the data authorization information is stored in a blockchain network; and after the sending the data use permission application to the permission approver, the method further includes the following:

first status query information submitted by the data requestor for the data use permission application is obtained, where the first status query information includes the data use permission application;

the data use permission application is queried from the blockchain network based on the first status query information;

a query result returned by the blockchain network for the first status query information is obtained; and the query result is sent to the data requestor.

When the service platform is a blockchain network, or a combination of a central platform and a blockchain network, the service platform can further store the data authorization information in the blockchain network, to facilitate verification on the data authorization information when the data requestor initiates a data acquisition request.

In addition, if the data requestor fails to receive the data authorization information for a specific reason, the data requestor can initiate an application status query request. The service platform can search the blockchain network to determine whether the data authorization information is stored in the blockchain network, and then send a query result to the data requestor. There are only two query results: the data authorization information exists and the data authorization information does not exist.

Figure 2:
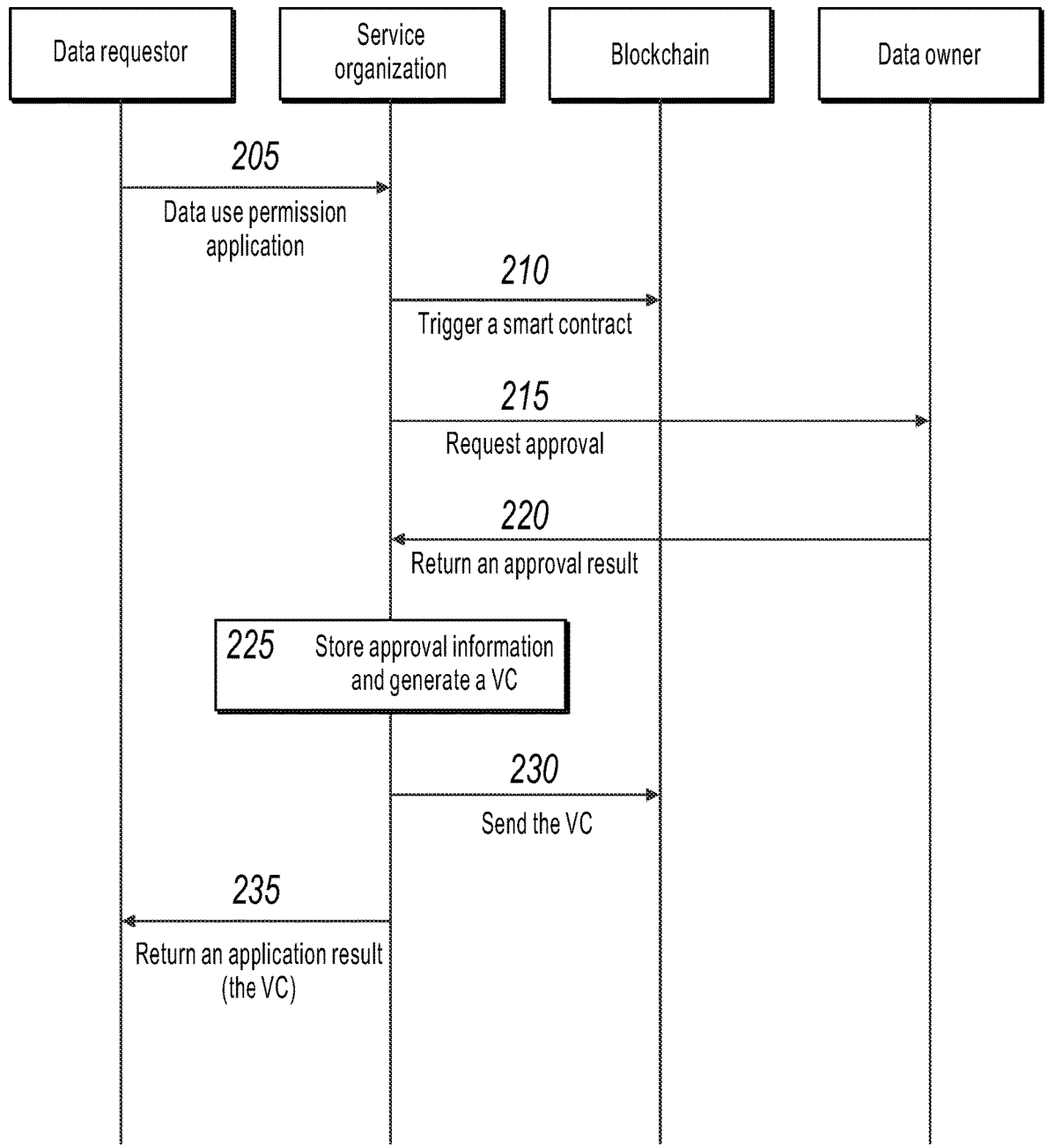
FIG. 2 is a schematic flowchart illustrating another data authorization information acquisition method, according to embodiments of the present specification.

The application status query method can query only whether the data authorization information exists, but cannot query an intermediate approval status. To resolve this problem, the following embodiment is provided: A service organization and a blockchain network jointly serve as a service platform. FIG. 2 is a schematic flowchart illustrating another data authorization information acquisition method, according to embodiments of the present specification.

As shown in FIG. 2, the method can include the following steps:

Step 205: A data requestor sends a data use permission application to a service organization.

Step 210: The service organization triggers a smart contract in a blockchain after receiving the data use permission application.

Step 215: The smart contract sends the data use permission application to a data owner for approval. There may be multiple data owners.

Step 220: The data owner returns an approval result to the service organization, where the approval result can be one or more pieces of acknowledgement information.

Step 225: The service organization stores approval information and generates a VC based on the approval information.

Step 230: The service organization sends the VC to the blockchain for storage.

Step 235: The service organization returns an application result to the data requestor, where the application result can be the VC if the approval succeeds.

In the solution, the service organization stores each step of the approval process of the permission approver in a local device. Therefore, in the approval process, the data requestor and each permission approver can query an approval status. Specifically, the method can further include the following:

the first acknowledgement information is stored in a local device;

second status query information submitted by the data requestor for the data use permission application is obtained, where the second status query information includes the data use permission application;

the data use permission application is queried from the local device based on the second status query information; and the first acknowledgement information is sent to the data requestor.

It should be noted that the second status query information can be initiated by the data requestor or the permission approver. For example, after completing the approval, the first permission approver can pay attention to the approval process and query an approval progress.

The method is suitable for querying a status of an approval that has not been completed.

Optionally, the method can further include the following:

a data acquisition application submitted by the data requestor for the first data is obtained, where the data acquisition application includes the data authorization information;

the data authorization information is sent to the blockchain network for validity verification; and the first data is sent to the data requestor after the verification succeeds.

After the data authorization information is obtained, the first data can be obtained based on the data authorization information. Before the data is obtained, validity verification needs to be performed on the data authorization information. The data authorization information can be verified based on the tamper-resistance characteristic of the blockchain network. The data authorization information is compared with information stored in the blockchain network to determine whether the data authorization information is valid. The first data can be sent to the data requestor only when the data authorization information is valid.

It should be noted that the first data may exist in a device of the data owner of the first data, or may exist in a device of a data provider of the first data. At this time, the data owner is different from the data provider. This case is described below by using a specific embodiment.

Figure 3:
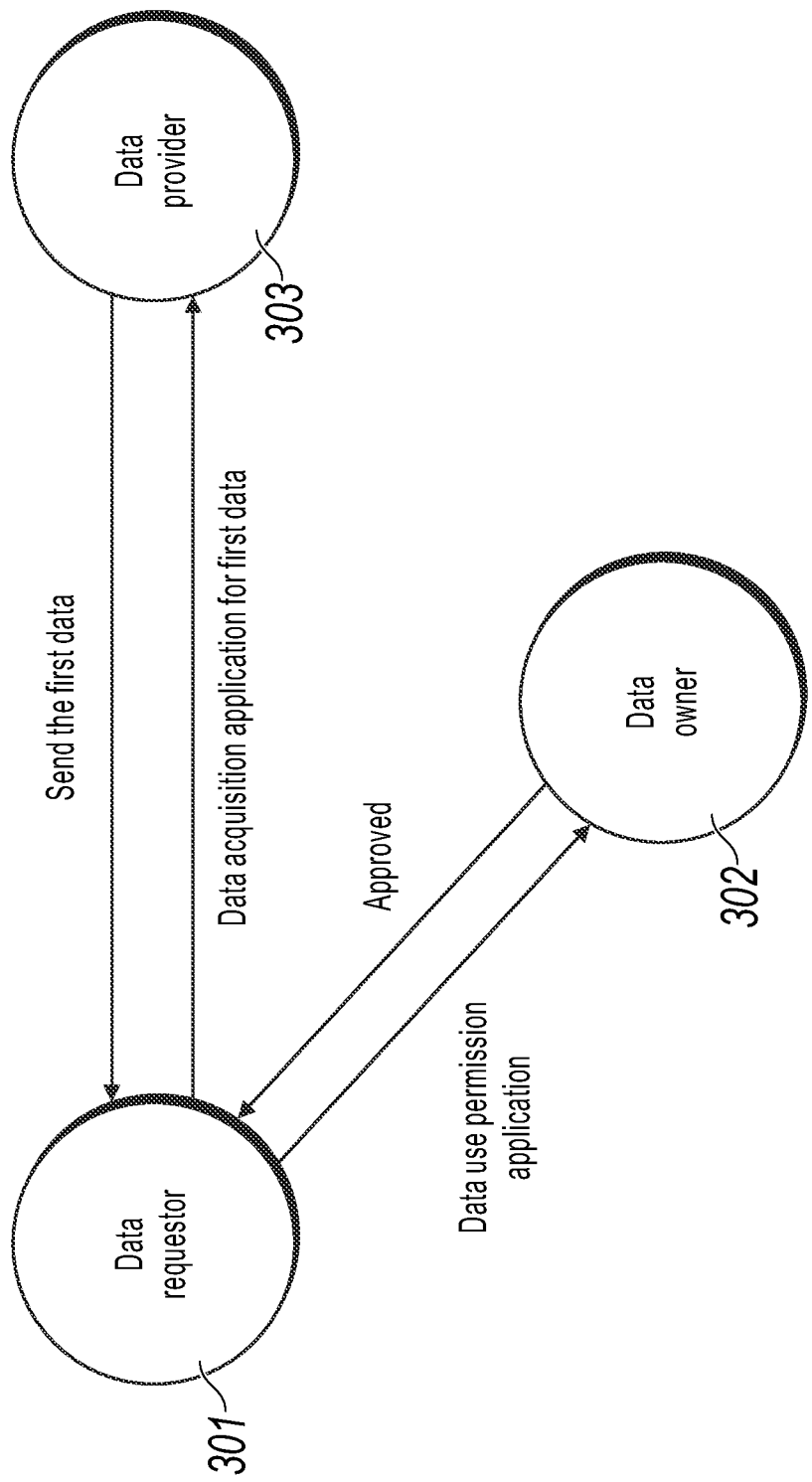
FIG. 3 is a schematic diagram illustrating a scenario of different data acquisition methods between a data owner and a data provider of the first data, according to embodiments of the present specification.

FIG. 3 is a schematic diagram illustrating a scenario of different data acquisition methods between a data owner and a data provider of the first data, according to embodiments of the present specification.

FIG. 3 includes three different identities: a data requestor 301, a data owner 302, and a data provider 303. The data requestor needs to obtain data of the data owner from the data provider. For example, the data requestor obtains a salary statement of an individual from a bank, obtains real estate information of an individual from a real estate center, or obtains a credit report of an individual from a credit institution. Certainly, in addition to individual user information, obtained information can alternatively include enterprise user information. The enterprise user information is not listed here.

The data requestor 301 initiates a data use permission application, and the data owner 302 performs approval on the data use permission application. After the approval succeeds, the data requestor 301 obtains data authorization information. Then, the data requestor 301 sends a data acquisition application, and then obtains first data of the data owner 302 from the data provider 303.

Optionally, before the sending the first data to the data requestor, the method can further include the following:
a data provider of the first data is determined; and
the first data is obtained from the data provider.

The data provider of the first data can be determined based on data stored in the blockchain or declaration information of the data owner. The data owner can declare an acquisition method of the first data. The acquisition method can be limiting a communication address of the data provider.

The acquisition of the first data from the data provider can be limited in a trusted execution environment. For example, each blockchain node can implement a secure execution environment of a blockchain transaction by using a TEE. The TEE is a security extension based on CPU hardware and is isolated from the outside. Currently, the industry attaches great importance to TEE solutions. Almost all mainstream chip and software alliances have respective TEE solutions, such as a trusted platform module (TPM) in a software aspect, and Intel software guard extensions (SGX), an ARM trust zone (Trustzone), and an AMD platform security processor (PSP) in a hardware aspect. The TEE can function as a hardware black box. Code and data executed in the TEE cannot be peered even at the operating system layer, and can be operated only by using an interface predefined in the code. In terms of efficiency, due to the black box nature of the TEE, instead of a complex cryptographic operation in homomorphic encryption, a plaintext data operation is performed in the TEE, so that efficiency is not lost in a calculation process. Therefore, the TEE is deployed on a blockchain node, so that privacy needs in a blockchain scenario can be satisfied to a great extent under the premise of a relatively small performance loss.

Optionally, before the sending the first data to the data requestor, the method can further include the following:

authorized data, an authorized user, and a validity period are determined in the data authorization information after first verification success information sent by the blockchain network is received; and
it is determined whether the authorized data is consistent with the first data, the authorized user is consistent with the data requestor, and a current moment is in the validity period, to obtain a first determining result; and
the sending the first data to the data requestor specifically includes:
sending the first data to the data requestor when the first determining result is yes.

Affected by the blockchain, the data owner can verify only whether the data authorization information is valid, while logical information of the data authorization information, such as the authorized data, the authorized user, and the validity period, needs to be verified by the service organization. In the data permission approval process, the service organization stores all approval information. Therefore, the authorized data, the authorized user, and the validity period in the data authorization information can be verified by using the stored information. The first data can be sent to the data requestor if the user initiating the data acquisition application is the same as the authorized user information in the data authorization information, the data applied for is same as the authorization information in the data authorization information, and the data authorization information is in the valid period.

Optionally, the method can further include the following:
a use permission revocation application for the first data is obtained, where the use permission revocation application includes the data authorization information;
the data authorization information is sent to the blockchain network for validity verification; and
revocation information of the data authorization information is stored in the blockchain network after the verification succeeds; and
the revocation information of the data authorization information is sent to the data requestor.

For data that needs to be paid for, the data requestor can also have permission application revocation needs. At this time, the embodiments further provide a permission revocation method.

The permission revocation is performed for the data authorization information. First, it needs to verify whether the data authorization information is valid, and a revocation operation can be performed only on a basis that the data authorization information is valid.

Optionally, before the storing revocation information of the data authorization information in the blockchain network, the method can further include the following:
an authorized user in the data authorization information is determined after second verification success information sent by the blockchain network is received;
an applicant of the use permission revocation application for the first data is determined; and
it is determined whether the applicant is consistent with the authorized user to obtain a second determining result; and
the storing revocation information of the data authorization information in the blockchain network specifically includes:
storing the revocation information of the data authorization information in the blockchain network when the second determining result is yes.

On the basis that the data authorization information is valid, whether the applicant initiating the permission revocation is consistent with the data authorization information needs to be further verified, to prevent the data authorization information from being revoked incorrectly. Information that needs to be checked can include whether the applicant proposing the use permission revocation application for the first data is consistent with the authorized user in the data authorization information, and can further include whether the data authorization information is in the validity period, etc.

Figure 4:
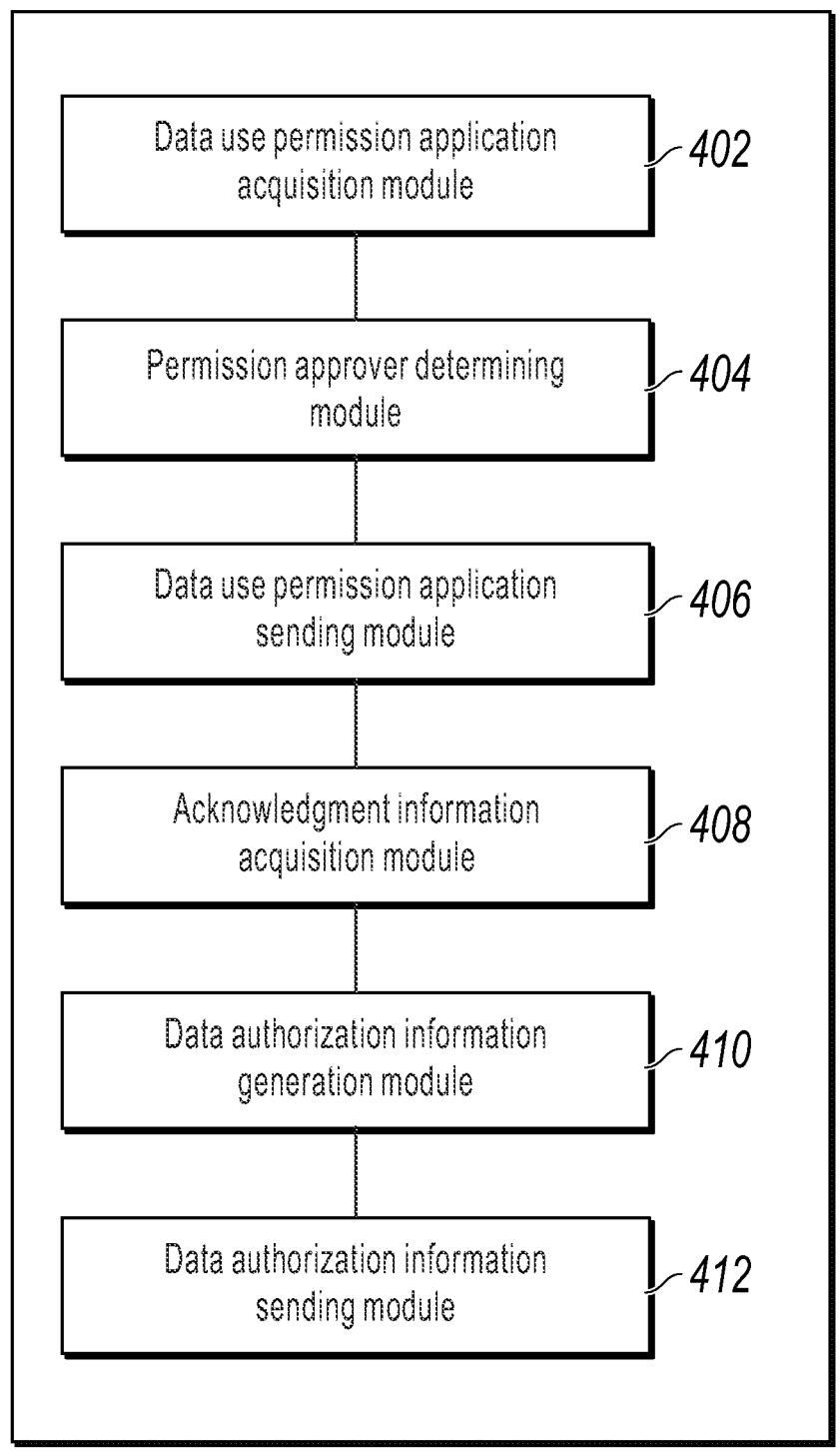
FIG. 4 is a schematic structural diagram illustrating a data authorization information acquisition apparatus corresponding to FIG. 1, according to embodiments of the present specification.

Based on the same idea, embodiments of the present specification further provide an apparatus corresponding to the previously described method. FIG. 4 is a schematic structural diagram illustrating a data authorization information acquisition apparatus corresponding to FIG. 1, according to embodiments of the present specification. As shown in FIG. 4, the apparatus can include:

a data use permission application acquisition module 402, configured to obtain a data use permission application submitted by a data requestor for first data;

a permission approver determining module 404, configured to determine a permission approver of the first data based on the data use permission application, where the permission approver is an owner of the first data;

a data use permission application sending module 406, configured to send the data use permission application to the permission approver;

an acknowledgement information acquisition module 408, configured to obtain acknowledgement information of the permission approver;

a data authorization information generation module 410, configured to generate data authorization information based on the acknowledgement information; and a data authorization information sending module 412, configured to send the data authorization information to the data requestor.

Based on the apparatus in FIG. 4, embodiments of the present specification further provide some specific implementations of the method. The specific implementations are described below.

Optionally, the permission approver determining module 404 can specifically include:

a data type determining unit, configured to determine a data type of the first data based on the data use permission application;

a smart contract determining unit, configured to determine a smart contract based on the first data and the data type, where the smart contract is a permission application approval process for the first data; and a permission approver determining unit, configured to determine the permission approver of the first data based on the smart contract.

Optionally, when there are at least two permission approvers, the data use permission application sending module 406 can specifically include:

a first sending unit, configured to send the data use permission application to a first permission approver; and a second sending unit, configured to send the data use permission application and first acknowledgement information of the first permission approver to a second permission approver after the first acknowledgement information is obtained.

Optionally, the data authorization information generation module 410 can specifically include:

a first determining unit, configured to determine authorized data, an authorized user, and a validity period based on the acknowledgement information, where the authorized data is the first data, and the authorized user is the data requestor; and a data authorization information generation unit, configured to generate the data authorization information based on the authorized data, the authorized user, and the validity period, where the data authorization information includes the first data and the data requestor.

Optionally, the apparatus can further include:

a data authorization information storage module, configured to store the data authorization information in a blockchain network;

a first status query information acquisition module, configured to obtain first status query information submitted by the data requestor for the data use permission application, where the first status query information includes the data use permission application;

a first query module, configured to query the data use permission application from the blockchain network based on the first status query information;

a query result acquisition module, configured to obtain a query result returned by the blockchain network for the first status query information; and a query result sending module, configured to send the query result to the data requestor.

Optionally, the data use permission application sending module 406 can further include:

a first acknowledgement information storage unit, configured to store the first acknowledgement information in a local device; and the apparatus can further include:

a second status query information acquisition module, configured to obtain second status query information submitted by the data requestor for the data use permission application, where the second status query information includes the data use permission application;

a second query module, configured to query the data use permission application from the local device based on the second status query information; and a first acknowledgement information sending module, configured to send the first acknowledgement information to the data requestor.

Optionally, the apparatus can further include:

a data acquisition application acquisition module, configured to obtain a data acquisition application submitted by the data requestor for the first data, where the data acquisition application includes the data authorization information;

a first verification module, configured to send the data authorization information to the blockchain network for validity verification; and a first data sending module, configured to send the first data to the data requestor after the verification succeeds.

Optionally, the apparatus can further include:

a first identifying module, configured to identify authorized data, an authorized user, and a validity period in the data authorization information after first verification success information sent by the blockchain network is received; and a first determining module, configured to determine whether the authorized data is consistent with the first data, the authorized user is consistent with the data requestor, and a current moment is in the validity period, to obtain a first determining result; and the first data sending module is specifically configured to send the first data to the data requestor when the first determining result is yes.

Optionally, the apparatus can further include:

a data provider determining module, configured to determine a data provider of the first data; and a first data acquisition module, configured to obtain the first data from the data provider.

Optionally, the first data acquisition module can be specifically configured to obtain the first data from the data provider in a trusted execution environment, where the trusted execution environment is isolated from an operating system layer.

Optionally, the obtaining the first data from the data provider in a trusted execution environment can specifically include:

obtaining the first data from the data provider by using an interface predefined in code in the trusted execution environment.

Optionally, the apparatus can further include:

a use permission revocation application acquisition module, configured to obtain a use permission revocation application for the first data, where the use permission revocation application includes the data authorization information;

a second verification module, configured to send the data authorization information to the blockchain network for validity verification;

a revocation information storage module, configured to store revocation information of the data authorization information in the blockchain network after the verification succeeds; and a revocation information sending module, configured to send the revocation information of the data authorization information to the data requestor.

Optionally, the apparatus can further include:

an authorized user determining module, configured to determine an authorized user in the data authorization information after second verification success information sent by the blockchain network is received;

an applicant determining module, configured to determine an applicant of the use permission revocation application for the first data; and a second determining module, configured to determine whether the applicant is consistent with the authorized user to obtain a second determining result; and the revocation information storage module is specifically configured to store the revocation information of the data authorization information in the blockchain network when the second determining result is yes.

Based on the same idea, embodiments of the present specification further provide a device corresponding to the previously described method.

Figure 5:
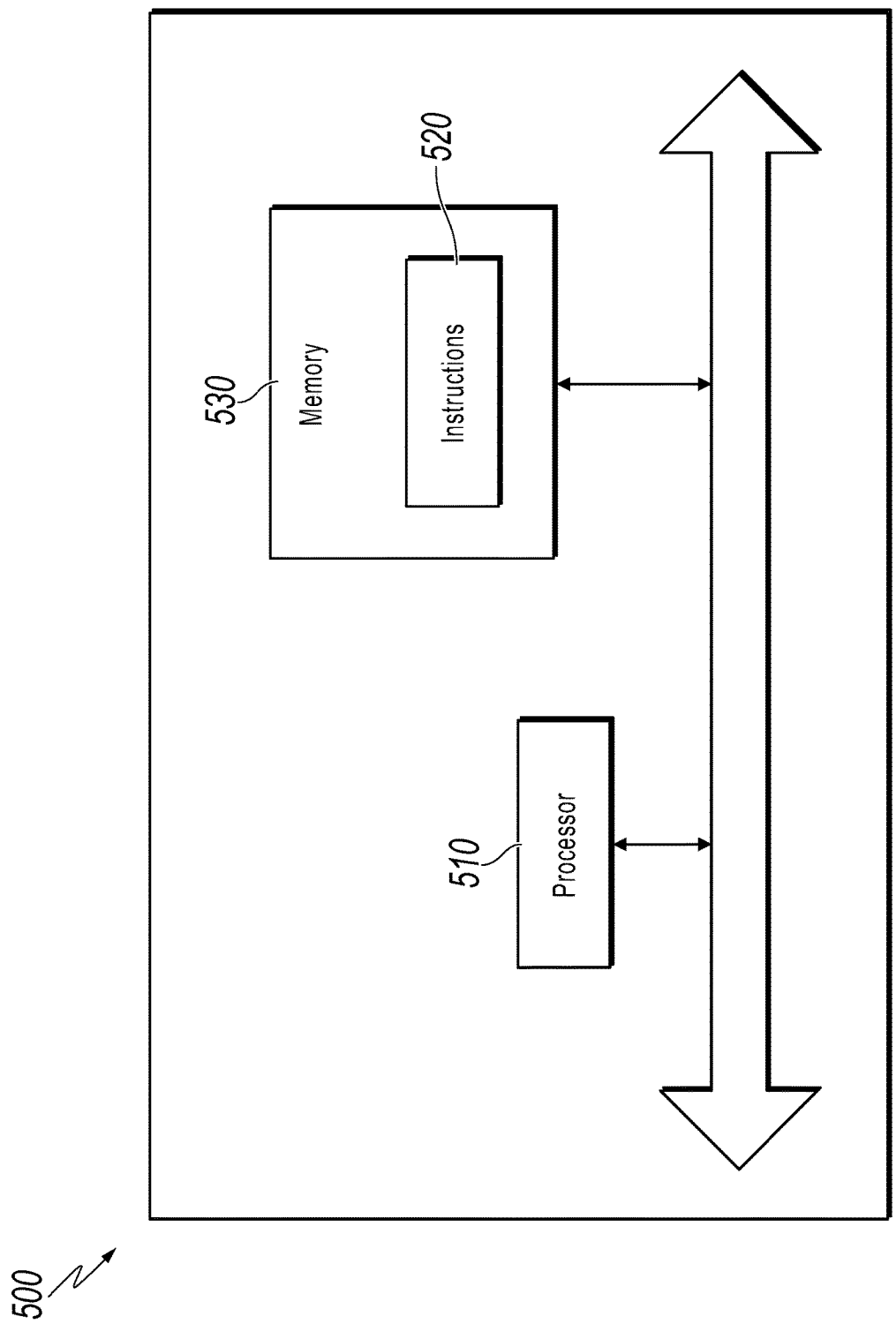
FIG. 5 is a schematic structural diagram illustrating a data authorization information acquisition device corresponding to FIG. 1, according to embodiments of the present specification.

FIG. 5 is a schematic structural diagram illustrating a data authorization information acquisition device corresponding to FIG. 1, according to embodiments of the present specification. As shown in FIG. 5, a device 500 can include:

at least one processor 510; and a memory 530 communicably coupled to the at least one processor.

The memory 530 stores instructions 520 that can be executed by the at least one processor 510, and the instructions 520 are executed by the at least one processor 510 to enable the at least one processor 510 to:

obtain a data use permission application submitted by a data requestor for first data;

determine a permission approver of the first data based on the data use permission application, where the permission approver is an owner of the first data;

send the data use permission application to the permission approver;

obtain acknowledgement information of the permission approver;

generate data authorization information based on the acknowledgement information; and send the data authorization information to the data requestor.

Based on the same idea, embodiments of the present specification further provide a computer-readable medium corresponding to the previously described method. The computer-readable medium stores computer-readable instructions, and the computer-readable instructions can be executed by a processor to implement the following method:

a data use permission application submitted by a data requestor for first data is obtained;

a permission approver of the first data is determined based on the data use permission application, where the permission approver is an owner of the first data;

the data use permission application is sent to the permission approver;

acknowledgement information of the permission approver is obtained;

data authorization information is generated based on the acknowledgement information; and the data authorization information is sent to the data requestor.

The embodiments in the present specification are all described in a progressive way, for same or similar parts in the embodiments, references can be made to these embodiments, and each embodiment focuses on a difference from other embodiments. Especially, the data authorization information acquisition device shown in FIG. 5 is basically similar to the method embodiment, and therefore is described briefly. For related parts, references can be made to parts of the method embodiment descriptions.

In the 1990s, whether a technical improvement is a hardware improvement (for example, an improvement on a circuit structure, such as a diode, a transistor, or a switch) or a software improvement (an improvement on a method procedure) can be clearly distinguished. However, as technologies develop, current improvements of many method procedures can be considered as direct improvements to hardware circuit structures. Almost all designers program an improved method process into a hardware circuit, to obtain a corresponding hardware circuit structure. Therefore, a method process can be implemented by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used at present. A person skilled in the art should also understand that a hardware circuit that implements a logical method procedure can be readily obtained provided that the method procedure is logically programmed by using several of the previously described HDLs and is programmed into an integrated circuit.

A controller can be implemented by using any appropriate method. For example, the controller can be in a form of a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can be alternatively implemented as a part of the control logic of the memory. A person skilled in the art should also know that, in addition to implementing the controller by using only the computer-readable program code, method steps can be logically programmed to allow the controller to implement the same function in a form of the logic gate, the switch, the ASIC, the programmable logic controller, or the built-in microcontroller. Therefore, the controller can be considered as a hardware component, and an apparatus included in the controller for implementing various functions can also be considered as a structure in the hardware component. Alternatively, the apparatus for implementing various functions can even be considered as both a software module for implementing the method and a structure in the hardware component.

The system, apparatus, module, or unit illustrated in the previously described embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any device combination of these devices.

For ease of description, when the apparatus is described, the apparatus is divided into various units based on functions for separate description. Certainly, when the present application is implemented, the functions of the units can be implemented in one or more pieces of software and/or hardware.

A person skilled in the art should understand that the embodiments of the present invention each can be provided as a method, a system, or a computer program product. Therefore, the present invention can use a form of hardware only embodiments, software only embodiments, or embodiments with a combination of software and hardware. Moreover, the present invention can use a form of a computer program product implemented on one or more computer-usable storage media (including but not limited to a magnetic disk memory, a CD-ROM, an optical memory, etc.) that include computer-usable program code.

The present invention is described with reference to the flowcharts and/or block diagrams of the method, the device (system), and the computer program product according to the embodiments of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions can be stored in a computer-readable memory that can instruct a computer or another programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase-change random access memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape/magnetic disk memory or another magnetic storage device, or any other non-transmission medium. The computer storage medium can be configured to store information accessible to a computing device. Based on the definition in the present specification, the computer-readable medium does not include transitory media, such as a modulated data signal and carrier.

It is worthwhile to further note that, the terms "include", "comprise", or their any other variants are intended to cover a non-exclusive inclusion, so that a process, a method, a product, or a device that includes a list of elements includes not only those elements but also other elements not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the present application each can be provided as a method, a system, or a computer program product. Therefore, the present application can use a form of hardware only embodiments, software only embodiments, or embodiments with a combination of software and hardware. In addition, the present application can use a form of a computer program product implemented on one or more computer-usable storage media (including but not limited to a magnetic disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The previously described descriptions are merely embodiments of the present application, and are not intended to limit the present application. A person skilled in the art can make various modifications and changes to the present application. Any modification, equivalent replacement, improvement, etc. made without departing from the spirit and principle of the present application shall fall within the scope of the claims of the present application.

What is claimed is:

1. A computer-implemented method, comprising:
   receiving, from a data requestor, a data use permission application for using data;
   determining, based on the data use permission application, an approver, wherein the approver is an owner of the data;
   sending the data use permission application to the approver;
   receiving acknowledgement information of the approver for receiving the data use permission application;
   sending the acknowledgement information to a second approver of the data use permission application;
   storing the acknowledgement information on a local device;
   in response to receiving a query from the data requestor, obtaining a status of the data use permission application on the local device, wherein the query comprises the data use permission application;
   sending the acknowledgement information to the data requestor;
   generating data authorization information based on the acknowledgement information; and
   sending the data authorization information to the data requestor.

2. The computer-implemented method according to claim 1, wherein determining the approver comprises:
   determining a data type of the data based on the data use permission application;
   determining a smart contract based on the data and the data type, wherein the smart contract comprises an approval process of the data use permission application; and
   determining the approver of the data based on the smart contract.

3. The computer-implemented method according to claim 1, wherein generating the data authorization information comprises:
   determining the data as authorized data, the data requestor as an authorized user, and a validity period based on the acknowledgement information; and
   generating the data authorization information based on the authorized data, the authorized user, and the validity period, wherein the data authorization information comprises the data and information of the data requestor.

4. The computer-implemented method according to claim 1, further comprising:
   storing the data authorization information on a blockchain; and
   after sending the data use permission application to the approver, receiving a first status query from the data requestor for the data use permission application, wherein the first status query comprises the data use permission application;
   querying the data use permission application on the blockchain based on the first status query to obtain a query result; and
   sending the query result to the data requestor.

5. The computer-implemented method according to claim 1, further comprising:
   receiving a data acquisition application from the data requestor for the data, wherein the data acquisition application comprises the data authorization information;
   sending the data authorization information to a blockchain network for validity verification; and
   in response to the validity verification being successful, sending the data to the data requestor.

6. The computer-implemented method according to claim 5, wherein the method further comprises:
   in response to the validity verification being successful, identifying authorized data, an authorized user, and a validity period in the data authorization information; and
   sending the data to the data requestor further in response to determining that the authorized data is the data, the authorized user is the data requestor, and a current moment is in the validity period.

7. The computer-implemented method according to claim 5, further comprising:
   determining a data provider of the data; and
   receiving the data from the data provider.

8. The computer-implemented method according to claim 7, wherein receiving the data from the data provider comprises:
   receiving the data from a trusted execution environment (TEE) of the data provider through an interface predefined by codes in the TEE, wherein the TEE is isolated from an operating system.

9. The computer-implemented method according to claim 1, further comprising:
   receiving a use permission revocation application for the data, wherein the use permission revocation application comprises the data authorization information;

sending the data authorization information to a blockchain network for validity verification;
receiving a validity verification result from the blockchain network;
in response to the validity verification result indicating a successful validity verification, storing revocation information of the data authorization information on a blockchain associated with the blockchain network; and
sending the revocation information to the data requestor.

10. The computer-implemented method according to claim 9, further comprising:
in response to the validity verification result indicating a successful validity verification, determining an authorized user in the data authorization information;
determining an applicant of the use permission revocation application for the data; and
storing the revocation information on the blockchain further in response to determining that the applicant is the authorized user.

11. A non-transitory, computer-readable medium storing one or more instructions executable by a computer system to perform operations comprising:
receiving, from a data requestor, a data use permission application for using data;
determining, based on the data use permission application, an approver, wherein the approver is an owner of the data;
sending the data use permission application to the approver;
receiving acknowledgement information of the approver for receiving the data use permission application;
sending the acknowledgement information to a second approver of the data use permission application;
storing the acknowledgement information on a local device;
in response to receiving a query from the data requestor, obtaining a status of the data use permission application on the local device, wherein the query comprises the data use permission application;
sending the acknowledgement information to the data requestor;
generating data authorization information based on the acknowledgement information; and
sending the data authorization information to the data requestor.

12. The non-transitory, computer-readable medium according to claim 11, wherein determining the approver comprises:
determining a data type of the data based on the data use permission application;
determining a smart contract based on the data and the data type, wherein the smart contract comprises an approval process of the data use permission application; and
determining the approver of the data based on the smart contract.

13. The non-transitory, computer-readable medium according to claim 11, wherein generating the data authorization information comprises:
determining the data as authorized data, the data requestor as an authorized user, and a validity period based on the acknowledgement information; and
generating the data authorization information based on the authorized data, the authorized user, and the validity period, wherein the data authorization information comprises the data and information of the data requestor.

14. The non-transitory, computer-readable medium according to claim 11, further comprising:
storing the data authorization information on a blockchain; and
after sending the data use permission application to the approver, receiving a first status query from the data requestor for the data use permission application, wherein the first status query comprises the data use permission application;
querying the data use permission application on the blockchain based on the first status query to obtain a query result; and
sending the query result to the data requestor.

15. The non-transitory, computer-readable medium according to claim 11, further comprising:
receiving a data acquisition application from the data requestor for the data, wherein the data acquisition application comprises the data authorization information;
sending the data authorization information to a blockchain network for validity verification; and
in response to the validity verification being successful, sending the data to the data requestor.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, from a data requestor, a data use permission application for using data;
determining, based on the data use permission application, an approver, wherein the approver is an owner of the data;
sending the data use permission application to the approver;
receiving acknowledgement information of the approver for receiving the data use permission application;
sending the acknowledgement information to a second approver of the data use permission application;
storing the acknowledgement information on a local device;
in response to receiving a query from the data requestor, obtaining a status of the data use permission application on the local device, wherein the query comprises the data use permission application;
sending the acknowledgement information to the data requestor;
generating data authorization information based on the acknowledgement information; and
sending the data authorization information to the data requestor.

* * * * *